United States Patent [19]
Bode et al.

[11] Patent Number: 4,989,723
[45] Date of Patent: * Feb. 5, 1991

[54] PLASTIC CONVEYOR BELT SYSTEM WITH IMPROVED PRODUCT SUPPORT

[75] Inventors: Robert H. Bode; William P. Hidden, both of Wenham, Mass.

[73] Assignee: The Cambridge Wire Cloth Company, Cambridge, Md.

[*] Notice: The portion of the term of this patent subsequent to Sep. 24, 2002 has been disclaimed.

[21] Appl. No.: 577,361

[22] Filed: Feb. 6, 1984

[51] Int. Cl.$^5$ ........................ B65G 47/74; B65G 17/06
[52] U.S. Cl. ..................................... 198/635; 198/853
[58] Field of Search .............. 198/325, 635, 637, 831, 198/834, 851–853; D34/28, 29; D8/499; 474/207, 218, 232–235

[56] References Cited

U.S. PATENT DOCUMENTS

| | | |
|---|---|---|
| Re. 30,341 | 7/1980 | Lapeyre et al. .................... 198/834 |
| D. 231,633 | 5/1974 | Totani et al. ......................... D34/29 |
| D. 248,826 | 8/1978 | Lehtola ................................ D8/499 |
| D. 263,228 | 3/1982 | Nitz et al. ............................ D15/5 |
| 263,699 | 9/1882 | Heebner ............................... 198/834 |
| D. 270,201 | 8/1983 | Hodlewsky et al. ................ D34/29 |
| D. 270,202 | 8/1983 | Hodlewsky et al. ................ D34/29 |
| 289,466 | 12/1883 | Stutz ................................... 198/834 |
| 304,193 | 8/1884 | Harrison ............................. 198/834 |
| 355,513 | 1/1887 | Dodge ................................. 198/834 |
| 561,162 | 6/1896 | Furbush .............................. 198/834 |
| 1,714,721 | 5/1929 | Mojonnier .......................... 198/853 |
| 1,755,450 | 4/1930 | Mojonnier .......................... 198/853 |
| 1,861,840 | 6/1932 | Claghorn ............................ 198/853 |
| 2,000,499 | 5/1935 | Roland ............................... 198/852 |
| 2,038,695 | 4/1936 | Wilmot ............................... 74/243 |
| 2,059,063 | 10/1936 | Tourville ............................ 198/834 |
| 3,073,430 | 1/1963 | Quinn ................................. 198/635 |
| 3,191,743 | 6/1965 | Rissler et al. ...................... 198/853 |
| 3,202,260 | 8/1965 | Wolf ................................... 198/635 |
| 3,214,007 | 10/1965 | Matthies et al. ................... 198/841 |
| 3,237,756 | 1/1966 | Pulver ................................ 198/841 |
| 3,261,451 | 7/1966 | Roinestad ........................... 198/852 |
| 3,311,222 | 3/1967 | Crawford et al. .................. 198/850 |
| 3,641,831 | 2/1972 | Palmaer .............................. 198/853 |
| 3,651,924 | 3/1972 | Homeier et al. ................... 198/852 |
| 3,774,752 | 11/1973 | Harvey ............................... 198/853 |
| 3,785,476 | 1/1974 | Poernik .............................. 198/853 |
| 3,870,141 | 3/1975 | Lapeyre et al. .................... 198/853 |
| 4,051,949 | 10/1977 | Lapeyre ............................. 198/853 |
| 4,058,021 | 11/1977 | Wood ................................. 74/229 |
| 4,080,842 | 3/1978 | Lapeyre et al. .................... 198/853 |
| 4,138,011 | 2/1979 | Lapeyre ............................. 198/844 |
| 4,140,025 | 2/1979 | Lapeyre ............................. 74/255 R |
| 4,153,152 | 5/1979 | Lapeyre ............................. 198/851 |
| 4,159,763 | 7/1979 | Kewley et al. ..................... 198/853 |
| 4,171,045 | 10/1979 | Lapeyre ............................. 198/853 |
| 4,184,588 | 1/1980 | Lapeyre ............................. 198/778 |
| 4,213,527 | 7/1980 | Lapeyre et al. .................... 198/853 |
| 4,394,901 | 7/1983 | Roinestad ........................... 198/850 |
| 4,438,838 | 3/1984 | Hodlewsky et al. ................ 198/853 |

FOREIGN PATENT DOCUMENTS 95933 12/1983 European Pat. Off. ............ 198/851

OTHER PUBLICATIONS

Intralox All-Plastic Conveyor Belting; Engineering Design Data, by Intralox, Inc., New Orleans, La. 70150, 24 pages and covers, 3 page supplement, dated Oct. 1, 1983.

Res Mat Top Chains; for Versatile, Economical, Dependable Conveying, By Rexnord, Inc., Milwaukee, Wis. 53201, 21 pages and cover, TM 1981.

(List continued on next page.)

*Primary Examiner*—Joseph E. Valenza
*Attorney, Agent, or Firm*—Cushman, Darby & Cushman

[57] ABSTRACT

An endless conveyor belt is assembled of plastic modules having relatively open pintle slots receiving respective connecting rods. The product support surface of the belt is provided by closely-spaced ribs especially well-suited for conveying raw foods and small containers. For transferring product to or from the belt, a transfer plate made-up of closely-spaced, flat-surfaced fingers is provided. The belt is driven and guided by sets of polygonal sprockets having teeth which engage in cavities centrally located on the undersides of the respective belt modules.

30 Claims, 10 Drawing Sheets

OTHER PUBLICATIONS

KVP; All-In-One Plastic Belt, KVP Company, Sacramento, Calif. 95826, 4 pages, no date.

Ashworth's Prestoflex Conveyor Belting; A Guide to Performance Properties, by Ashworth Bros., Inc., Winchester, Va. 22601, 11 pages and cover, 1982-1983.

Alloy Plus . . . ; Introducing . . . Plastic Modular Belting, by Alloy Wire Belt California, 2 pages, no date.

Plastic Modular Honeyflex by Umec-Boydel (Belting) Limited, Wolverhampton, England, 2 pages, Mar. 1979.

Wiremation Plastic Belting Strength & Versatility, Wiremation Industries, Lancaster Pa. 17604, 10 pages and covers, no date.

PLASTIC CONVEYOR BELT SYSTEM WITH IMPROVED PRODUCT SUPPORT

BACKGROUND OF THE INVENTION

In the commonly assigned, copending U.S. patent application of one of us, Bode, Ser. No. 351,629, filed Feb. 23, 1982, there are shown and described several embodiments of modular conveyor belting molded of synthetic plastic material. In many of the embodiments, the belting modules which are hinged together by plastic rods, are designed to be able to negotiate horizontal turns, i.e. lateral turns, within the plane of the support surface of the belting. An embodiment particularly designed for straight-running without horizontal turns is disclosed in that application with reference to FIGS. 19 and 20 of that application. Common to the design of all of the belt module embodiments of Ser. No. 351,629 are pintles which have transverse slots that are oversize with respect to the rods which are received through the slots to pivotally interconnect longitudinally adjoining belt modules and unite transversely adjoining belt modules. On the straight-running belts, the oversize slots are configured to permit the pintle, slot and pin regions of the belt to be readily cleaned.

An important commercial use of such conveyor belt made of modules that are molded of synthetic plastic resin, is in transporting rather small objects along a processing line through several stations or at least from one station to another. The small objects may be loose, e.g. fresh green beans being transported through a blanching station to a freezer, or they may be bottles or other containers of a product, e.g. small recently-lidded jars of jam being conveyed through a washing station.

A typical way of collecting objects at the end of a conveyor run is to juxtapose a support surface level with the downstream end of the conveyor run. Where the objects to be accepted from the conveyor are large the support surface may be constituted by a simply-configured dead plate. However, especially where the objects to be collected are small, it is generally necessary to provide a set of fingers on the upstream margin of the stationary support surface, which fingers intercalate with the conveyor belt structure so as to provide a transfer comb for more gradually and smoothly transferring support of the objects from the moving belt to the stationary support surface, or to another conveyor.

Where small objects are to be transported by a conveyor that is molded of synthetic plastic material, an especially challenging structural design problem has existed in the art, which in the view of the present inventors has heretofore gone unsolved by any commercially marketed conveyor belt system. The problem has seemed inherent: that if support features were made thin and closely spaced, modules were potentially short-lived and difficult to keep clean, but if they were thickened and more widely spaced, small objects were poorly supported due to the size of gaps between support features and there was a lack of flatness in the support surface. In addition, the belt-module/sprocket interface has presented a structural design problem: when sprocket teeth drive against connecting rods and module hinges, stress concentrations may cause modules, hinges and sprockets to be short-lived and belt tracking to be unstable.

SUMMARY OF THE INVENTION

An endless conveyor belt is assembled of plastic modules having relatively open pintle slots receiving respective connecting rods. The product support surface of the belt is provided by closely-spaced ribs especially well-suited for conveying raw foods and small containers. For transferring product to or from the belt, a transfer plate made-up of closely-spaced, flat-surfaced fingers is provided. The belt is driven and guided by sets of polygonal sprockets having teeth which engage in cavities centrally located on the undersides of the respective belt modules.

The principles of the invention will be further discussed with reference to the drawings wherein a preferred embodiment is shown. The specifics illustrated in the drawings are intended to exemplify, rather than limit, aspects of the invention as defined in the claims.

DETAILED DESCRIPTION

Figure 1:
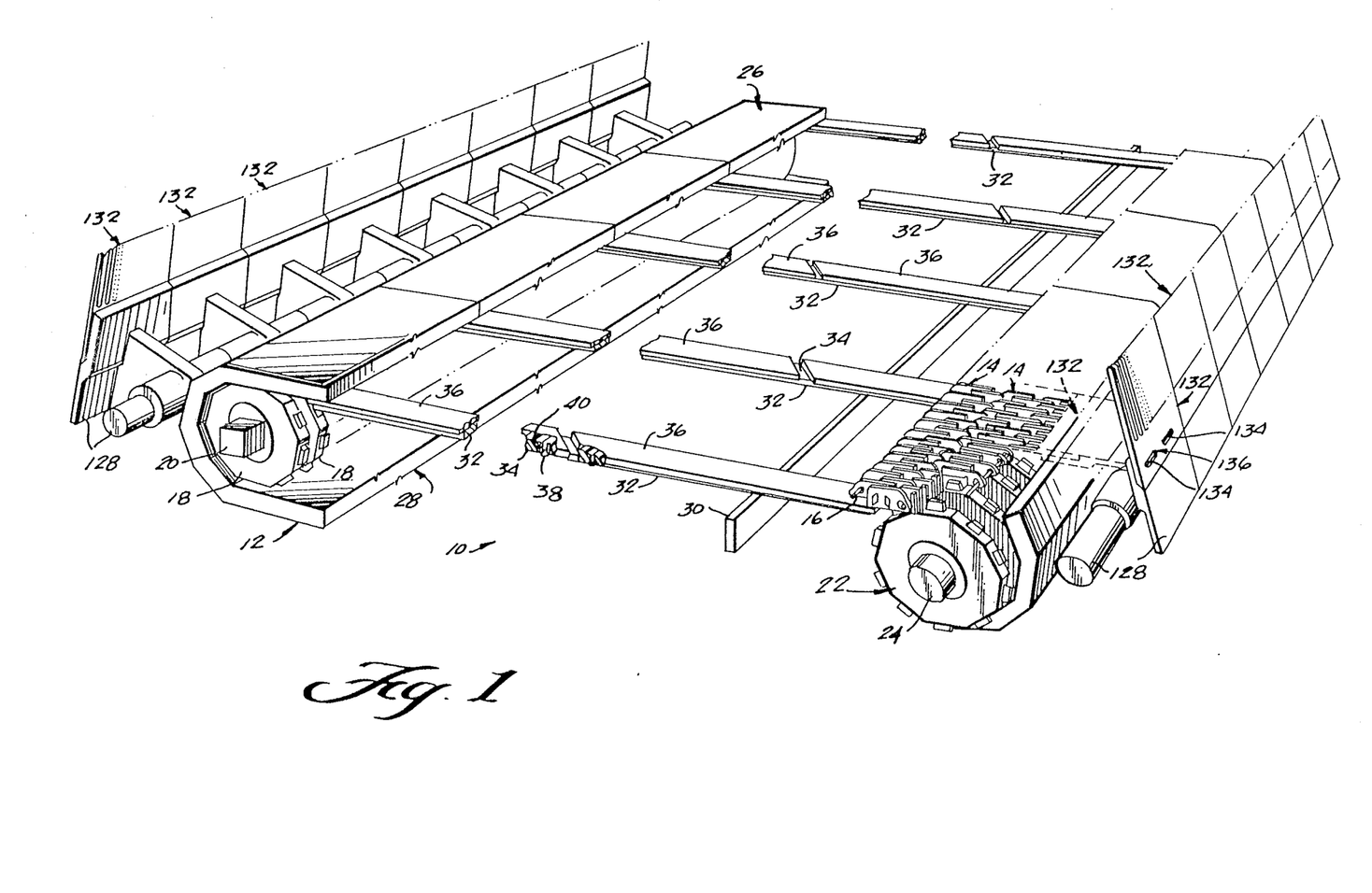
FIG. 1 is a somewhat schematic perspective view showing a conveyor belt system embodying principles of the present invention.

The conveyor belt system 10 of the present invention in its preferred embodiment comprises an endless conveyor belt 12 which is assembled of a plurality of belt modules 14 using connecting rods 16. The conveyor belt 12 is entrained about a first set of sprockets 18 mounted to a shaft 20 and about a second set of sprockets 22 mounted to a shaft 24. In the illustrated embodiment, the shaft 20 is a driven shaft provided at the downstream end of the carrying run 26 of the conveyor belt and the shaft 24 is an idler shaft provided at its upstream end. The return run of the conveyor belt is illustrated at 28.

It is possible to provide one or more additional sets of sprockets on respective shafts, for instance a set meshed with the top face of the return run of the belt intermediate the two sets illustrated, on a driven shaft, to provide a center drive for a long section. It is further possible to divide the carrying run into a series of sections for instance including a horizontal section leading into an inclined section which terminates in another horizontal section.

The conveyor system 10 includes a frame, shown represented by a structural support bar 30 (which may be one of several such transverse bars spaced from one another along either or both runs of the conveyor belt). Here, for the carrying run, the support bar 30 is shown having mounted thereon a plurality of longitudinally extending, transversely spaced rails 32. Typically the frame is made of stainless steel; its specific constructional details like those of the shafts 20, 24, their bearings and supports and the conveyor drive, are not part of the present invention, but rely on principles which are well-known in the art.

In the instance depicted, the wear surfaces 34 of the rails 32 are plated with wear strips 36 made of a synthetic plastic material and removably mounted in place using button-headed protrusions 38 integrally provided on the undersides of the wear strips 36 near the leading and trailing ends of the respective wear strips. For each wear strip 36, the button headed protrusions 38 near the leading end snaps into a round hole (not shown) through the respective rail 34, and the button headed protrusions 38 near the trailing end snap into a longitudinally elongated slot 40 through the rail 34. More details of the preferred wear strip and the way it is mounted are shown and described in the commonly-assigned, copending U.S. patent application of our colleagues Arthur P. Drennan et al, Ser. No. 574,242, filed Jan. 26, 1984. Other types of wear strips may be provided, as may other types of intermediate supports for either or both the carrying run and the return run of the conveyor belt.

Whereas in the illustrated embodiment the carrying run of the conveyor belt is shown supported on wear strip-plated rails of the frame and the return run is shown being unsupported between the sets of sprockets 18 and 22, in practice either or both runs may be supported by such wear strip-plated rails, or by other conventional means such as stationary slider beds, e.g. trays made of stainless steel, or on sets of horizontal, transversally extending rollers. Although continuous, longitudinally extending, transversally spaced rails 32 are illustrated, other patterns of rails may be provided, for instance, ones set in a staggered or herringbone pattern as is known in the art. And various combinations of supports may be used, e.g. a slider bed for the carrying run and support rollers for return run.

Although none is illustrated, the conveyor belt 12 may be conventionally provided with means for maintaining a desired degree of tension on the conveyor belt by taking up a certain degree or an adjustable amount of slack, e.g. by permitting the belt to hang in catenary arcs from roller to roller in the return run, or by using a screw-type or gravity type take-up roll applied against the conveyor belt in the return run.

Figure 5:
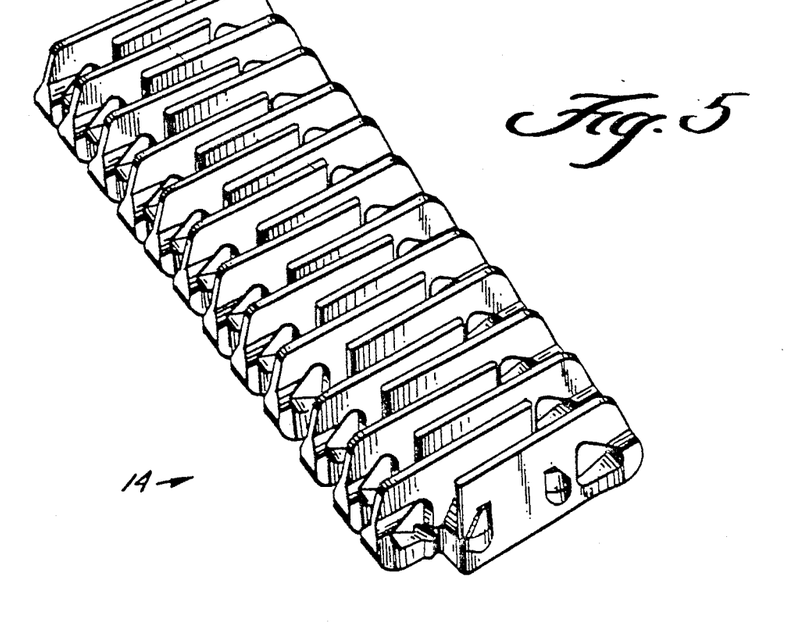
FIG. 5 is a perspective view from above showing an embodiment of the close rib conveyor belt module.
Figure 6:
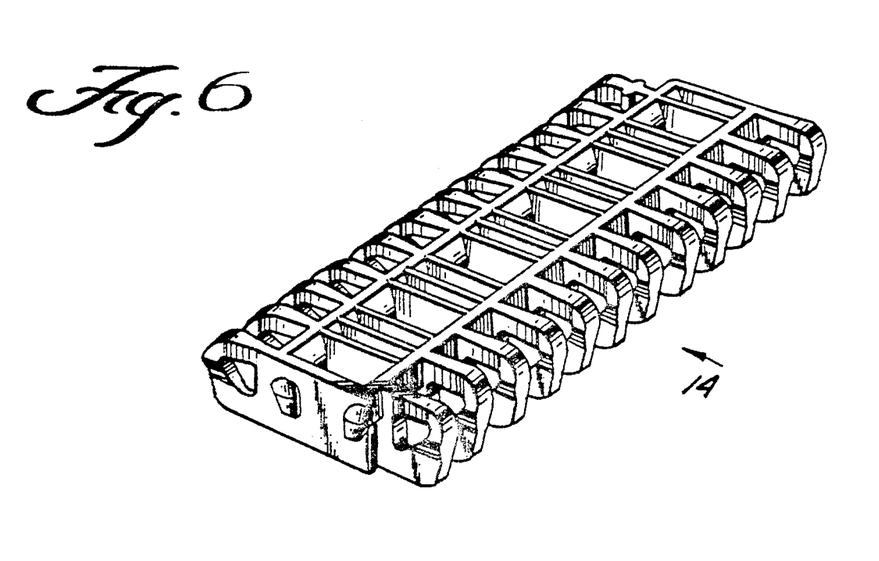
FIG. 6 is a perspective view from below showing the close rib conveyor belt module of FIG. 5.
Figure 7:
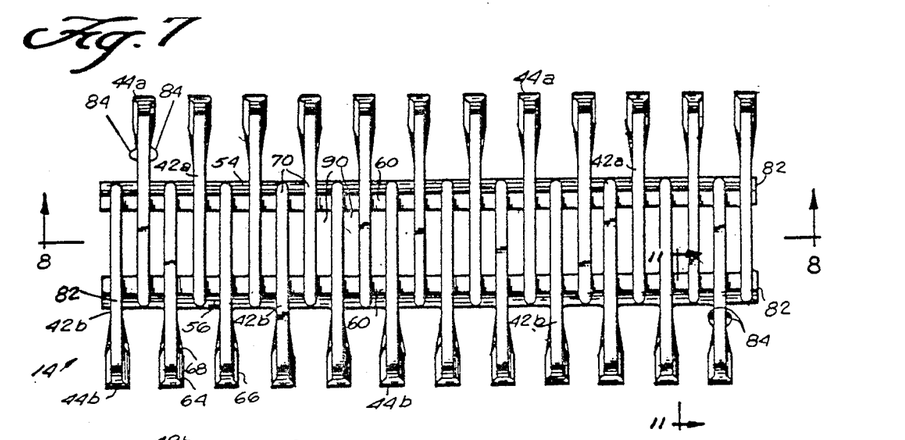
FIG. 7 is a top plan view thereof.

The conveyor belt 12 is shown being made-up of a plurality of close-rib belt modules 14 each of which is an integrally molded article. In general, each module comprises a plurality of longitudinally extending, tall but thin web-like ribs 42a, 42b provided in two transversally extending series which are interdigitated to such an extent that only knuckle portions 44a, 44b of the ribs are not separated from one another by intervening ribs of the other series. The knuckles 44a, 44b have respective oversize openings 46a, 46b provided through them transversally of the belt, these openings are of generally rounded-corner triangular shape as viewed transversally of the belt. Each opening 46a, 46b is oriented so that it has a lower side 48 that is at least generally horizontal, a side 50 nearest the center of the respective module 14 which is generally vertical, and an oblique side 52 which faces downwardly (when the respective module 14 is upright) and towards the center of the respective module.

Figure 8:
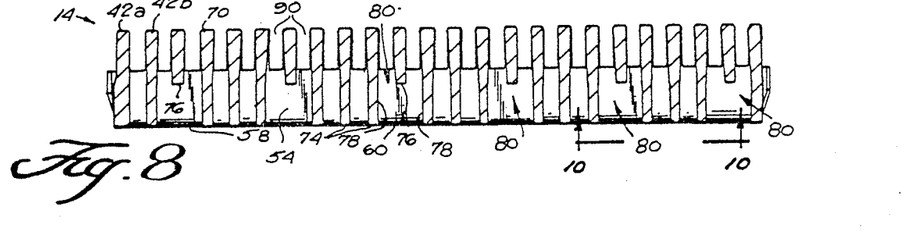
FIG. 8 is a sectional view thereof on line 8—8 of FIG. 7.
Figure 9:
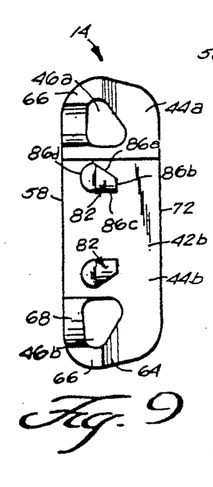
FIG. 9 is an end elevational view thereof.

The ribs 42a, 42b are joined transversally of each module by a leading web 54 and a trailing web 56. These webs are coplanar at the bottom with the flat lower surface 58 of the module, which is provided by the lower edges of the webs 54 and 56, the lower edges of most of the ribs 42a, 42b, and the lower edges of the knuckle portions 44a, 44b, out to where the knuckle portions begin to curve upwardly. Viewed in cross-section, the webs 54 and 56 are seen to extend upwards through slightly more than half the height of the module, at locations corresponding to those of the leading edges of the ribs which are oriented knuckle portion rearwards, and the trailing edges of the ribs which are oriented knuckle portion forwards, respectively.

The webs 54 and 56 are generally arcuate in cross-section in such a manner that their facing surfaces 60 are convex towards one another and flare away from one another as they proceed down to the lower surface 58. Further, the outer upper corner portion 62 of each web 54 and 56 is relieved along the full extent of each of these webs.

Figure 10:
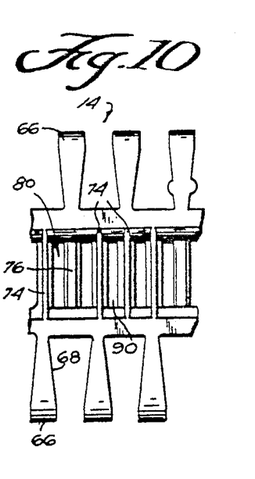
FIG. 10 is a fragmentary bottom plan view thereof, illustrating the portion included between the arrows 10—10 in FIG. 8.
Figure 11:
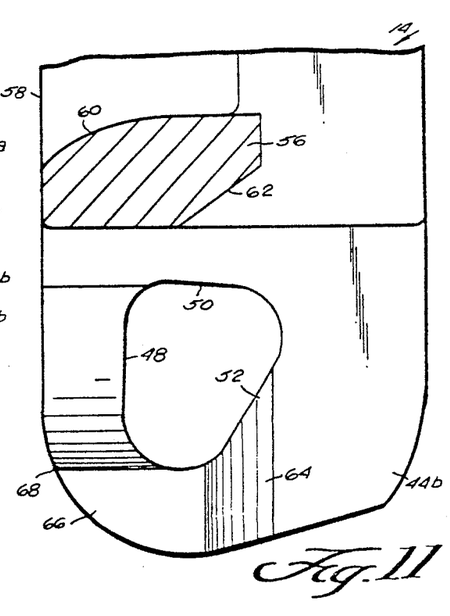
FIG. 11 is an enlarged fragmentary sectional view thereof, taken on line 11—11 of FIG. 7.

Except in its knuckle portion 44a, 44b where each of the ribs 42a, 42b gradually increases at 64 to have a broader outer, lower quadrant 66, then gradually decreases on the surface 58 at 68, the ribs 42a, 42b generally decrease in thickness from their relatively broader upper surfaces 70 which collectively provide the upper surface 72 of the module 14, down to their lower surfaces 74, most of which coincide with the flat lower surface 58 of the module 14. The module 14 shown by itself is illustrated as having twenty-four ribs, including twelve in the series 42a and twelve in the series 42b. Looking at the underside of the module, in the preferred embodiment illustrated, every fourth rib, i.e. alternate ribs in one of the series, is relieved so that it only extends about half-way from the upper surface 72 of the module down towards the lower surface 58 of the module. The elevated lower surfaces 76 of the truncated ribs, together with the side surfaces 78 of neighboring ribs and the facing surfaces 60 of the webs 54 and 56 define a series of six respective downwardly open pockets 80, located medially of the module (in a leading/trailing sense), each of which is constructed and arranged to receive a sprocket tooth for driving and guiding of the conveyor belt 12.

By preference, stub portions 82 of the webs 54 and 56 extend slightly leftwardly beyond the leftmost and slightly rightwardly beyond the rightmost of the respective outer ribs 42a, 42b of each module 14 to the extent necessary for aiding in maintaining proper uniform spacing between ribs from module to module widthwise of the multi-module width belt 12. Desired uniform spacing is also provided by staggering the joints between modules from row to row longitudinally of the belt 12, and by providing spacer bosses 84 on the left and right flanks of the one transversally indented outer knuckle portion 44a, 44b in each series. Preferably, each web stub portion 82 is ledged at 86a, 86b and 86c around its upper portion but blended gradually to nothingness around its lower periphery at 86d. Each of the four spacer bosses 84 is shown being generally semicylindrical and having its inner extent generally aligned with the generally vertical surface 50 of the respective slot 46a or 46b.

Figure 12A:
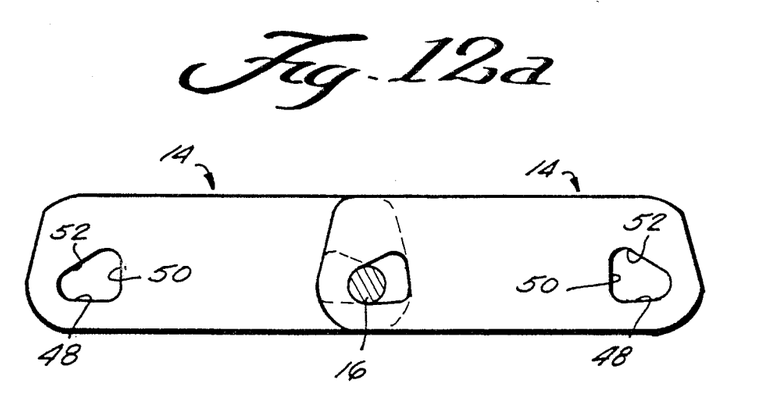
FIG. 12a is a schematic side elevational view showing the relation of a connecting rod to the pintle slots of two adjoining rows of conveyor belt modules.
Figure 12B:
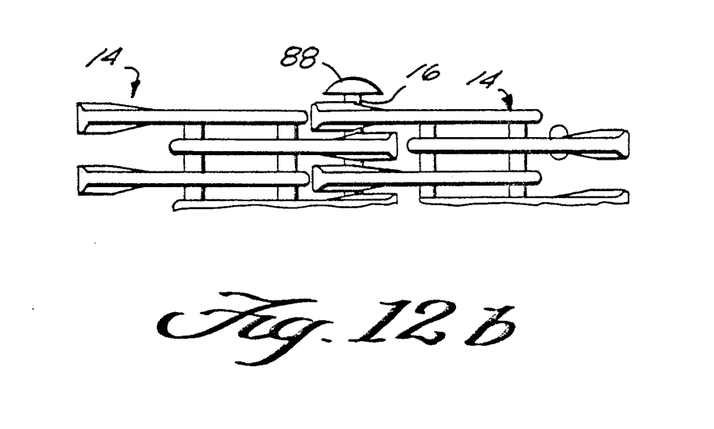
FIG. 12b is a corresponding fragmentary top plan view.

The belt 12 is assembled by placing several modules 14 end to end in one row, placing several more modules end to end in an adjacent row preferably with a transverse offset by, e.g. one-half a module (which may be accommodated by providing otherwise identical but correspondingly shorter modules at opposite ends of alternate rows, or the like), then interdigitatingly partially merging these two rows until all of the trailing knuckle portion openings 46b of the modules 14 in the leading row coincide with all of the leading knuckle portion openings 46a of the modules 14 in the trailing row of the modules 14. Then, a rod 16 is inserted the full width of the belt 12 through the aligned openings 46a, 46b. The rod 16 is upset, buttoned or otherwise provided with an enlargement 88 at each end to lock it in place. Because the generally cylindrical rod 16 within the belt 12 is of considerably smaller cross-sectional area than the generally rounded-corner triangular openings 46a, 46b, there is room for limited longitudinal condensation of the belt and for limited vertical upward movement of the rod 16 relative to its usual disposition in the openings 46a, 46b. However, the relative position shown is maintained in normal running of the belt due to tension on the belt and the camming action provided by the obliquely oriented surfaces 52 of the openings 46a, 46b.

Further assembly of the belt 12 from modules 14 and rods 16 is accomplished by repetition of the steps just outlined until at last a leading end of the belt is interdigitated with and pivotally pinned to a trailing end of the belt with a final rod 16 to create an endless loop.

By preference, the mechanical design of the modules 14 is such that as the belt is assembled, the upper surfaces 70 of the ribs cumulatively occupy about 50 percent of the overall surface area of the belt 12, and about 40 percent of the overall area is open.

When the belt 12 of the preferred embodiment as illustrated is made of a preferred stock material, polypropylene, it has an allowable strength of 1550 pounds per foot of belt width, an ultimate strength of 6200 pounds per foot of belt width, a weight of 1.90 pounds per square foot, a pitch of 2.0 inches, a thickness of 0.875 inch. and a reverse bend capability of 30 degrees.

A belt of this composition and mechanical design is suitable for use, wet or dry, in the temperature range of 32° F. to 220° F. The belt 12 may be made of other materials to suit different requirements of use. For instance, it may be made of polycarbonate plastic resin for use in the temperature range of −100° F. to 70° F., of polyethylene for use in the temperature range of −50° F. to 150° F. (wet or dry), of Delrin acetyl resin for use in the temperature range of −40° F. to 190° F. (wet) or up to 235° F. (dry), and of polysulfone resin for use in the temperature range of 70° F. to 350° F. As will be understood by those skilled in the art, these well-known plastic materials have different degrees of resistance to various chemicals at various temperatures and concentrations, so it is best to consult a standard chemical resistance guide before selecting the particular plastic to be used for a belt that will be subjected to a possibly harsh chemical during operation of the conveyor.

The mechanical design of the belt modules 14 is such that the slots 90 between ribs 42a, 42b are unlikely to entrap product pieces or fragments or debris being carried on the surface 72. That is in a large part due to the fact that the tapered ribs 42a, 42b are at their widest at the top, so that the slots 90 are at their smallest at the top, and wider towards their bottoms. Consequently, any particle inclined to fall into a slot 90 encounters less restriction as it moves downwards and so is most likely to fall comletely through. Further, the preferred arcuate, beveled straps of the belt module webs 54, 56 as described above give strong support for the ribs yet lack ledges or shelves on which debris or particles can lodge or become trapped. The belt 12 assembled of the preferred belt modules 14 as illustrated, embodies an integral open hinge concept, due to which at each module row to module row hinge point about a respective rod 16, the modules are free to rotate without adjacent ribs contacting each other. The openness further helps to avoid entrapment of product pieces, particles and debris. Under normal belt tension, the spacer bosses 84 provide correct and secure module spacing so as to maintain the ribs out of contact. The unique oversize cam slot shape 48, 50, 52 as used with the connecting rods 16 ensures that the hinges are relatively open and unrestricted, so that the possibility of product entrapment is minimized and cleaning of the belt is made easier and more efficient. Belt repair is facilitated, in that, upon longitudinally condensing the belt at the site of a module which needs replacing makes it easy to withdraw the respective connecting rods, remove and replace the affected module or modules, and re-install the connecting rods, or replacements therefor.

Although all of the modules 14 are shown being of longitudinally ribbed, flat top design, some or all of the modules may incorporate additional features for particular belt uses, e.g. transversally extending, upstanding, medially located cleats or longitudinally extending, upstanding, border located side guard flanges.

Figures 13, 14, 15, 16:
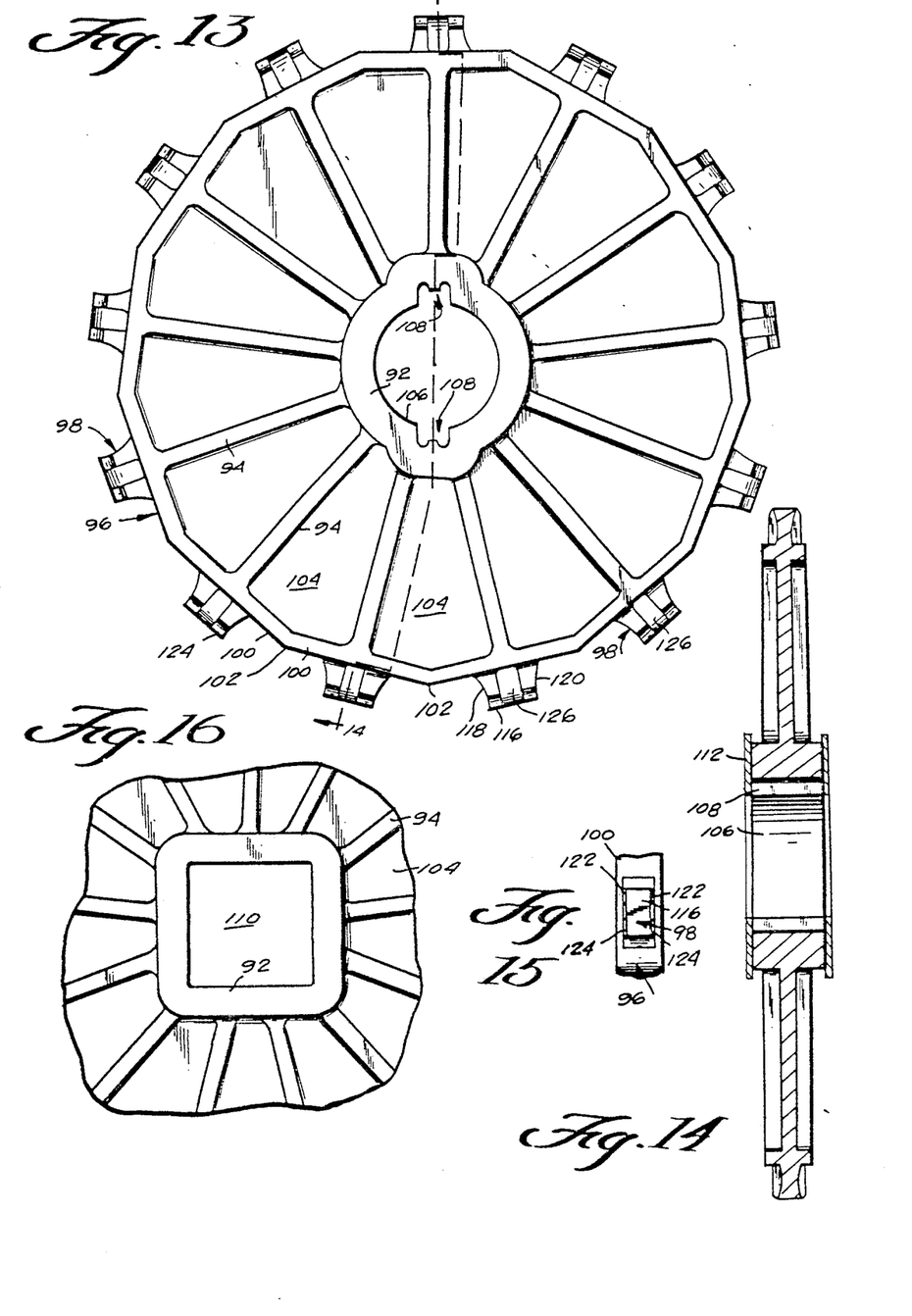
FIG. 13 is a side elevation view of a medium-sized sprocket constructed for use in the conveyor belt system of the present invention.
FIG. 14 is a sectional view thereof on line 14—14 of FIG. 13.
FIG. 15 is a fragmentary plan view thereof looking directly in at one tooth thereof.
FIG. 16 is a fragmentary side elevational view of a modified form of the medium-sized sprocket.

The belting 12 is preferably driven and tracked on the conveyor belt system 10 by being entrained about sets of sprockets 18 and 22 which may be all alike and molded of the same material as the belt modules. Each sprocket 18, 22 is shown being an integrally molded part having a hub 92, a plurality of spokes 94 radiating from the hub 92 and a polygonal running flange 96 having a single tooth 98 radiating from each land 100 thereof midway between each apex 102 thereof. Each tooth 98 is centered as a radially outward projection of a respective spoke 94. The respective space bounded by the hub 92, the running flange 96 and each two adjacent spokes 94 is shown bridged by an integral web 104 that is relatively thinner than its bounding elements. The length of each land 100 of the polygonal running flange 96 is related to the length along each module 14 between its leading and trailing hinge points, so that as the sprockets drive or track the belt, the sprocket teeth 98 run in the pockets 80 as the corresponding lands 100 engage the belt module lower surfaces 58 perimetrically of the respective pockets 80. As illustrated, all the sprockets on one shaft are of the same size, type and number of lands and teeth, although different driving ratios for different conveyors 10 can be achieved by replacing the sprockets with ones that are similar except for having a greater or lesser number of same length, toothed sides to the polygonal running flange 96, e.g. six inch (nominal diameter) sprockets with ten teeth, eight inch (nominal diameter) sprockets with thirteen teeth or ten inch (nominal diameter) sprockets with sixteen teeth.

Various ways and means may be used for conforming the hubs 92 to the shafts 20, 24 so that as the shafts turn, the sprockets turn with them. For instance, where the shaft is round and has a square key, the hub 92 may be provided with a round bore 106 with one or more keyway notches 108, and where the shaft is of square cross-section, the hub 92 may be provided with a correspondingly square bore 110.

On each shaft, the center sprocket or the sprocket closest to the center of the belt may be fixed in place against sliding axially of the shaft (transversally of the belt), e.g. by using retainer rings 112 fitted in grooves machined in the shaft immediately to the left and to the right of the intended location of the hub of that sprocket. The other sprockets may be permitted to float axially of the respective shafts in order to accommodate lateral expansion and contraction of the belt.

Sprocket to sprocket spacing on the same shaft may be varied depending on the total working tension of the belt and its rated strength in the temperature range in which it is to be used. The sprocket cavities or pockets 80 on the underside of the belt modules are preferably provided at one inch intervals (center to center) but not every one needs to be used.

It should be noted that the underside of the belt module 14, as shown, has an asymmetrical placement of sprocket cavities 80. Thus each individual module must be installed in the same orientation as all of the others in order to have its sprocket cavities properly aligned with those of neighboring modules 14 and with the sprocket teeth.

Each sprocket tooth 98 as shown has a flat, rectangular outer end surface 116, concavely beveled leading and trailing sides 118, 120 which are formed as mirror images of one another, and generally straight flanks 122 which taper towards one another at 124 near the end surface 116. The central region of each flank 122 is broadly, shallowly notched as shown at 126. Each tooth, in fact each sprocket, is preferably symmetrical so that there is no "right" and "wrong" direction to install it on the respective shaft 20 or 24. For one-direction drive conveyor belt systems, the mechanical design of the sprockets 18 permits use of standard single sprockets at maximum load without the necessity of installing expensive, specially machined, double sprockets. And for bi-directionally driven conveyors, the preferred symmetrical tooth shape on the sprockets 18 eliminates the need for alternating different handed sprockets on the drive shaft. In this situation, belt allowable strength is not reduced to less than its rated strength due to sprocket design restrictions.

In some instances, product may be transferred to and from the conveyor belt 12 using a conventional straight-edged or convoluted-edged deadplate juxtaposed with the upstream or downstream end of the carrying run of the conveyor and mounted on conventional substructure 128. However, in other instances, and particularly where the product being conveyed comprises small items or pieces, a specially designed modular fingered deadplate 130 preferably is used in place of the conventional deadplate. The specially designed modular fingered deadplate is assembled of transfer comb modules 132 which are juxtaposed end to end along the length of the substructure 128 and independently secured thereto, e.g. using machine screws 134 installed through recessed slots 136 extending widthwise of the base 138 of each comb module. By preference, each comb module is matched in extent in the widthwise direction of the belt with the belt modules 14, e.g. having twenty-four fingers, tines or teeth 140 each just narrow enough to be freely received between two adjoining ribs of belt modules 14. Near the base 138, the teeth 140 are as thick (tall) as the distance vertically between the support surface of the belt modules and the upper ends of the webs 54, 56. The teeth 140 taper towards their tips 142, principally because their lower edges 144 lie in a plane which converges toward the flat top surface 146 of the comb, but also because their upper edges 148 angle down slightly at 150 adjacent the tips.

Figure 17:
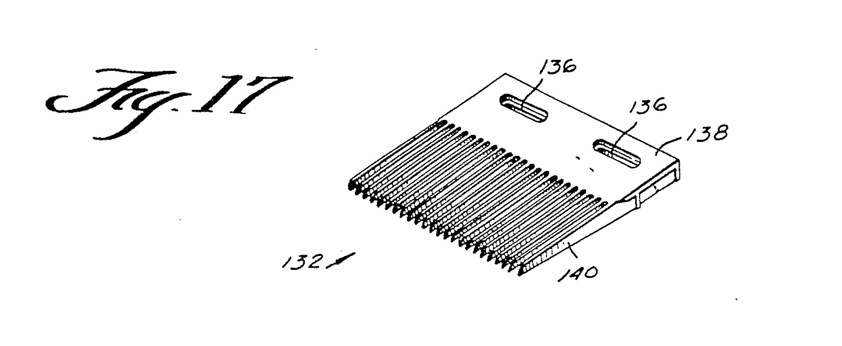
FIG. 17 is a perspective view from above of a transfer comb module for use in the conveyor belt system.
Figure 18:
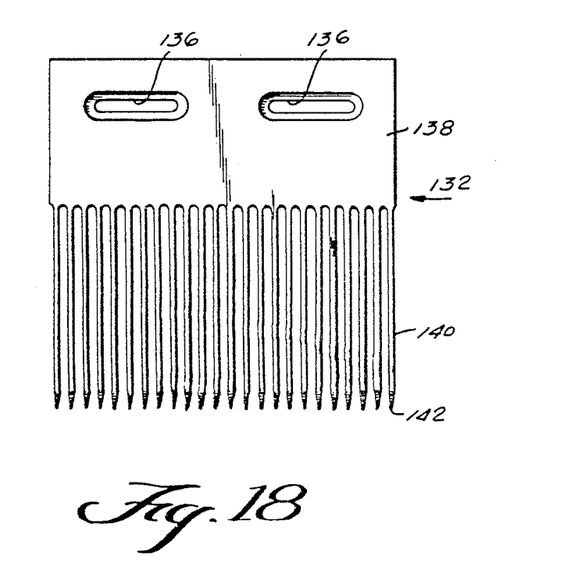
FIG. 18 is a top plan view thereof.
Figure 19:
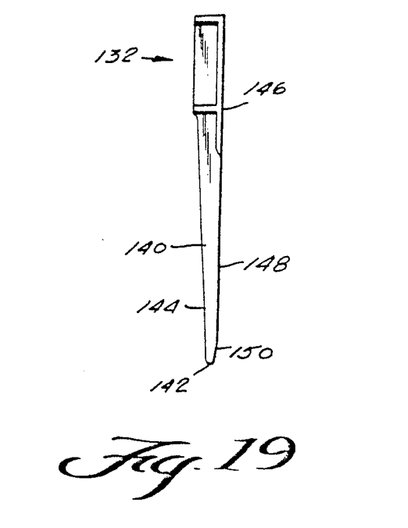
FIG. 19 is a side elevation view thereof.

Preferably, the comb modules 132 are molded of the same plastic materials as the belt modules, and the teeth 140 are somewhat flexible laterally in order to compensate for temperature variations and belt travel.

Figure 20:
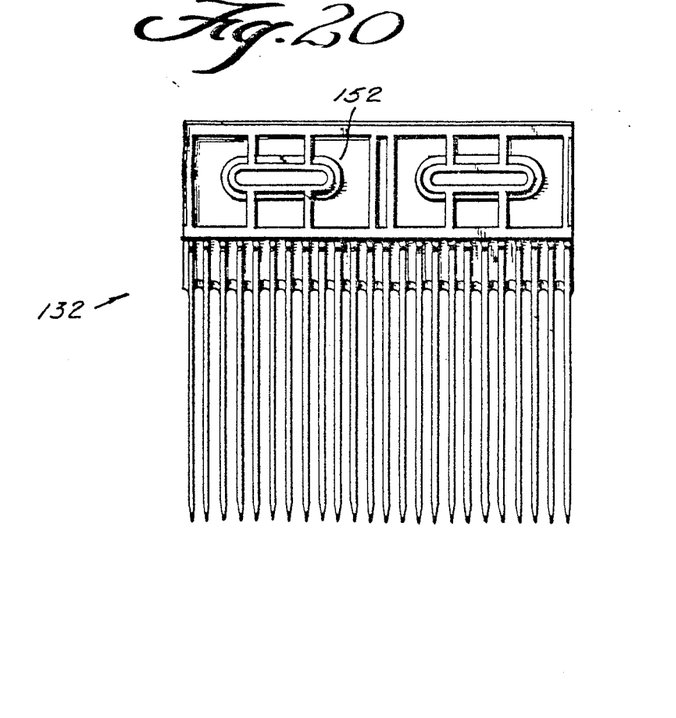
FIG. 20 is a bottom plan view thereof.
Figure 21:
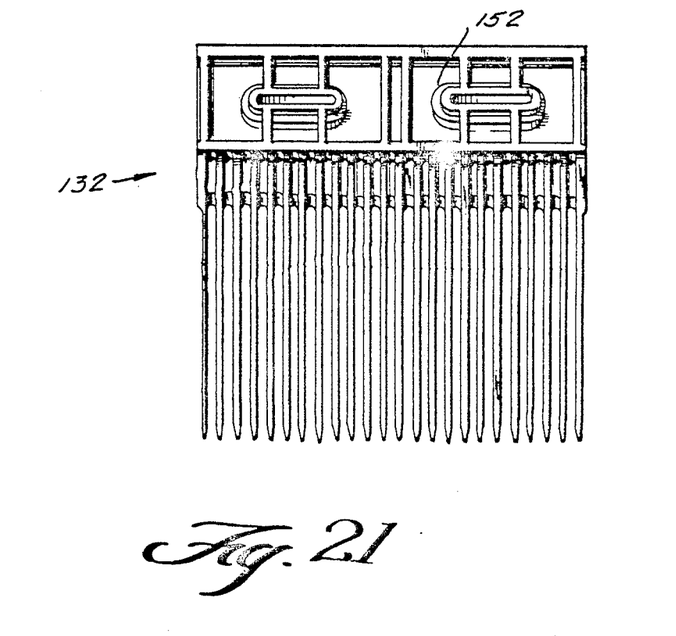
FIG. 21 is a bottom perspective view thereof.

Although the comb modules 132 preferably are molded of plastic material, they are mechanically designed to eliminate warpage and distortion that is common to other molded plastic transfer combs. An important factor in achieving the desired flatness of the top surface 146 is the coring of the underside 152, e.g. as shown, so as to provide well-balanced, consistent cooling at the conclusion of the injection molding process in manufacturing the comb modules. Webs and other sections are preferably designed to be of substantially equal effective thickness as shown.

Typical uses of the conveyor belt system of the present invention are to convey non-packaged food as it is cooling, or being blanched, deboned, frozen, inspected, sized, sorted, washed and/or dewatered, and to convey food packaged in bottles, cans or the like as it is being cooled, warmed, accumulated, palletized, depelletized, packed and/or packaged. Use is not restricted to processing and transporting of foods, but this is presently envisaged as being a major use.

In one typical use, the conveyor belt is 72-144 inches wide and its carrying run is 20-70 feet long. Containers of food or beverage are conveyed thereon as they cool, the ambient temperature being 180° F. and wet. The actual loading on the carrying run is 5-30 pounds per square foot. The belt is supported at sites intermediate the sets of sprockets, on a stainless steel slider belt or 3.5 inch diameter rollers. Belt take-up is by means of a return side screw-type take-up device provided at one or more locations. The belt is unidirectionally driven using the sprockets at the discharge end of the carrying run. Product transfer is by means of a deadplate or transfer combs.

In another typical use, the conveyor belt is 60–120 inches wide and its carrying run is 130 feet long. Containers of beer filled at 35° F. and carbonated are conveyed thereon as the product is pasteurized and cooled. The temperature in the holding zone of 55–60 feet is 160° F.; the temperature in the cooling zone of 70–75 feet is 75° F. The actual loading on the carrying run is 5–25 pounds per square foot. The belt is supported at sites intermediate the sets of sprockets on a roller bed-type of support. Belt take-up is by means of a return side screw-type take-up device provided at one or more locations. The belt is unidirectionally driven using the sprockets at the discharge end of the carrying run. Product transfer is by means of a deadplate.

In a further typical use, the conveyor belt is 60–120 inches wide and its carrying run is 20–40 feet long. Containers of food or beverage are conveyed thereon for accumulation precedent to conducting of a further step, such as packaging, the ambient conditions being room temperature and dry. The actual loading on the carrying run is 5–30 pounds per square foot. The belt is supported at sites intermediate the sets of sprockets on a stainless steel slider belt, a plurality of rails having wear surfaces plated with ultra high molecular weight polyethylene wear strips or wooden rails. Belt take-up, when needed, is by means of a terminal roll screw-type take-up device or by a gravity roll. The belt is driven bi-directionally using either the sprockets at the terminal roll, or at a site intermediate the ends of the carrying run. Product transfer is by means of a deadplate or transfer combs.

In another typical use, the conveyor belt is 48, 60, 72 or 96 inches wide, and its carrying run is 20 feet long. Empty containers for food or beverage are being depalletized thereon, the ambient conditions being room temperature and dry. The actual loading on the carrying run is 10–15 pounds per square foot. The belt is supported at sites intermediate the sets of sprockets on a plurality of rails having wear surfaces plated with ultra high molecular weight polyethylene wear strips, or oil-impregnated wood rails. Belt take-up is by means of a screw-type take-up device. The belt is driven bi-directionally using either the sprockets at the terminal roll, or at a site intermediate the ends of the carrying run. Product transfer is by means of a transfer comb or deadplate.

In another typical use, the conveyor belt is 48 or 50 inches wide and its carrying run is 6–8 feet long. Filled and closed containers of food or beverage are being conveyed thereon into a palletizing station, the ambient conditions being room temperature and dry. The actual loading on the carrying run is 10–20 pounds per square foot. The belt is supported at sites intermediate its sets of sprockets on a stainless steel slider belt or on rails which have their wear surfaces plated with wear strips made of ultra high molecular weight polyethylene. Belt take-up, where needed, is by means of a terminal roll-type of take-up device, or by a gravity roll. The belt is driven bi-directionally using either the sprockets at the terminal roll, or at a site intermediate the ends of the carrying run.

Further examples of products and processes using conveyor belt systems constructed in accordance with principles of the present invention are: conveying food-filled aluminum trays to a freezing station; feeding vegetables in food cans into a retort; conveying raw vegetables through washing and dewatering stations; conveying mushrooms to a blanching station with a ten foot level section followed by a ten foot inclined section; conveying meat patties through a freezer tunnel at minus 40 degrees F.; conveying frozen fish fillets from the freezer to a packaging line; conveying just-baked pizza as it cools; and side transferring packaged cakes and cupcakes on a packaging line.

Figure 2:
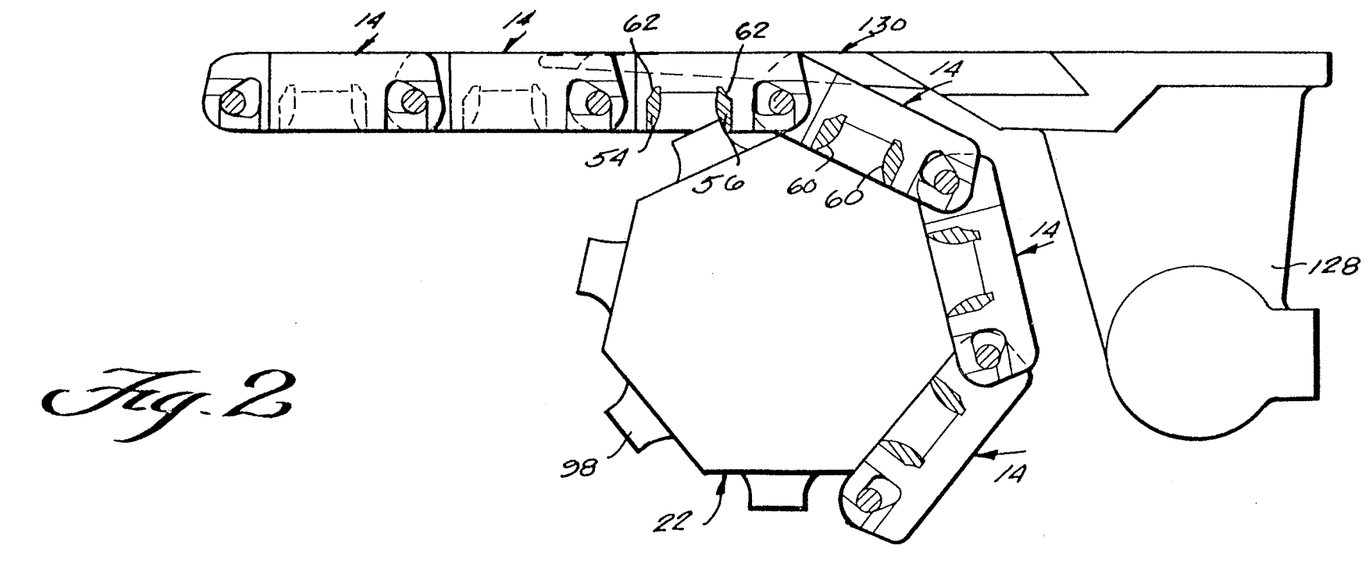
FIG. 2 is a somewhat schematic fragmentary longitudinal sectional view showing a conveyor belt of the present invention entrained about a relatively small (7 tooth, four inch) sprocket and juxtaposed with a transfer plate comprising a transfer comb module.
Figure 3:
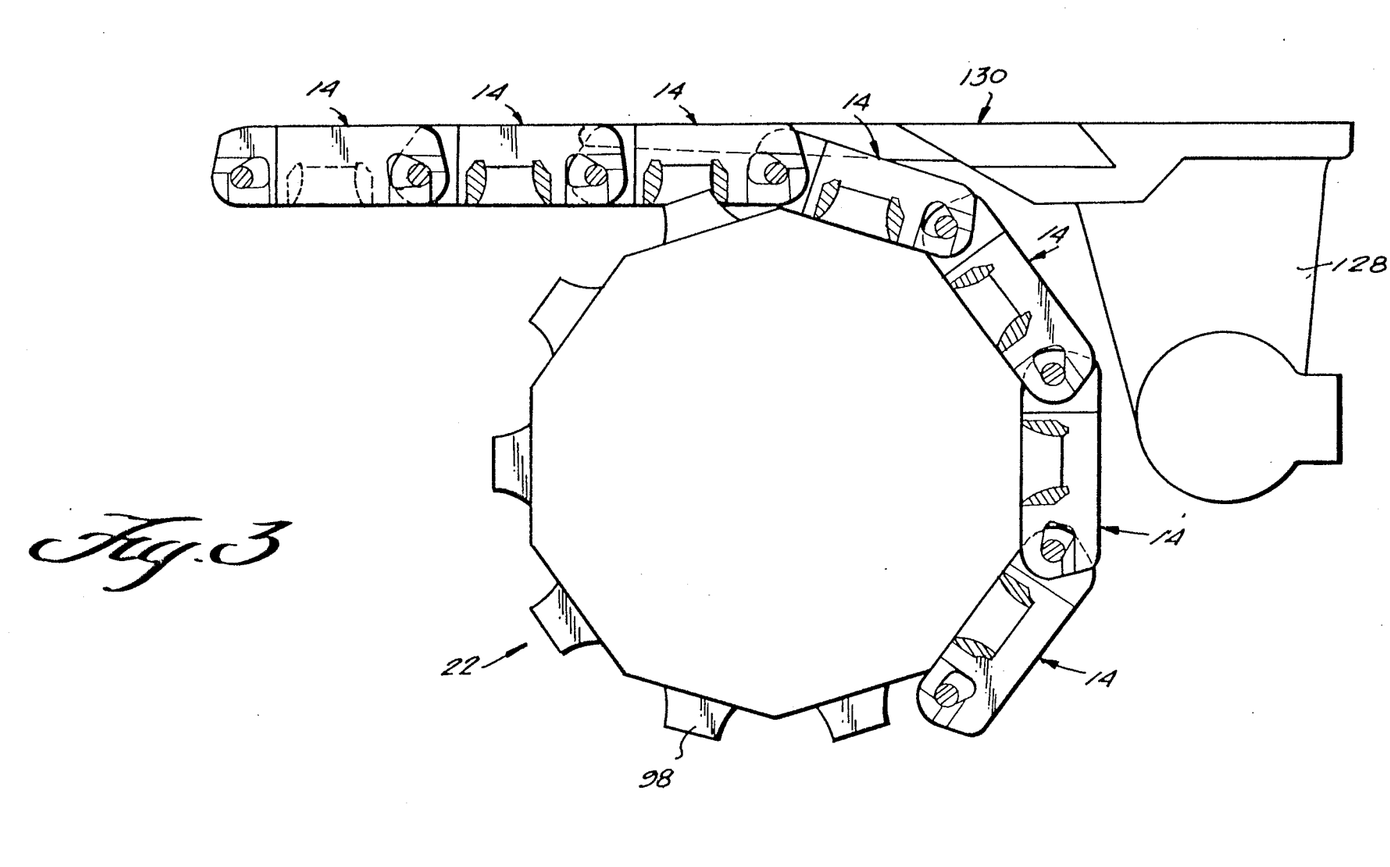
FIG. 3 is a fragmentary longitudinal sectional view similar to FIG. 2, but showing the conveyor belt entrained about a medium (10 tooth, six inch) sprocket.
Figure 4:
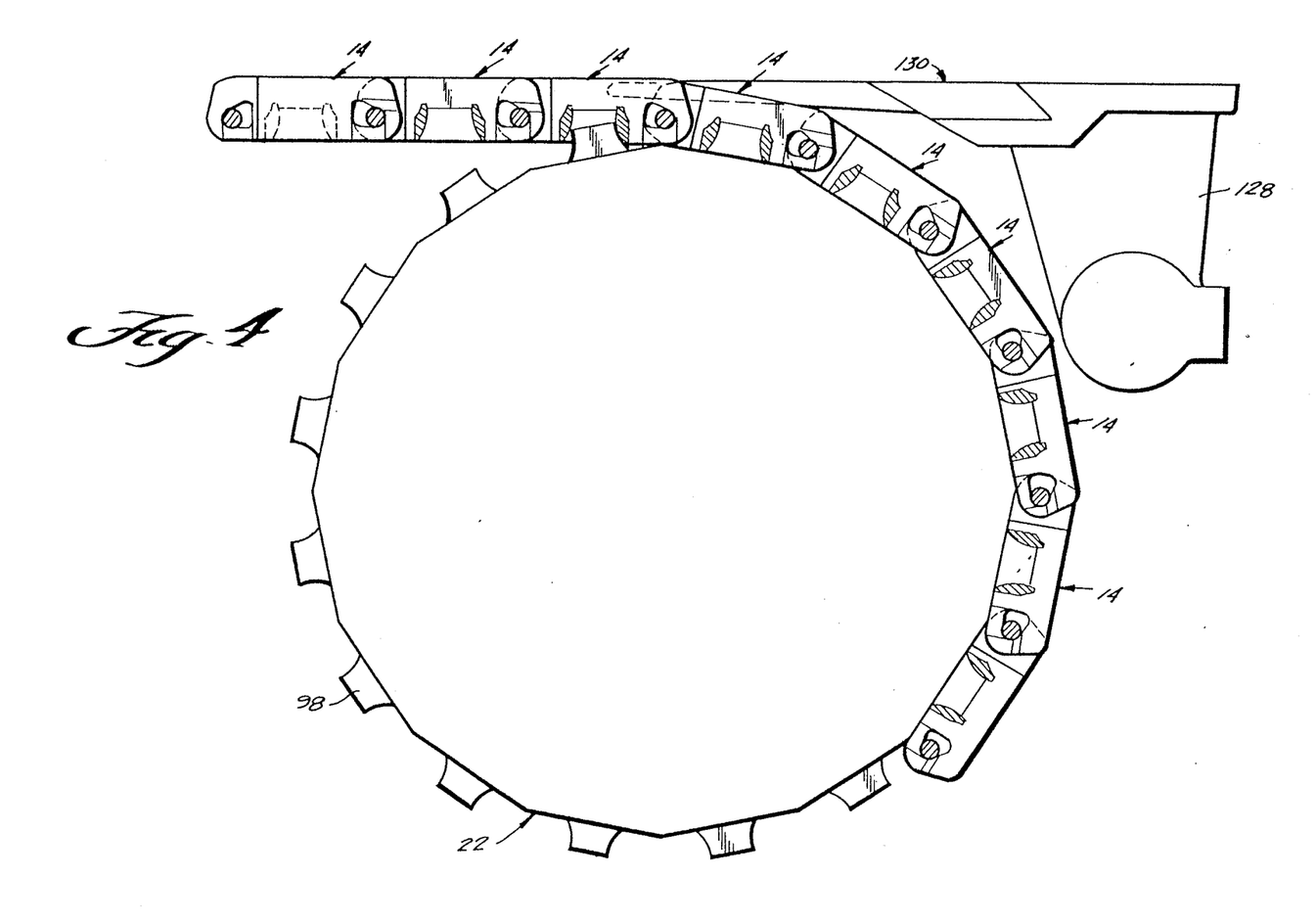
FIG. 4 is a fragmentary longitudinal sectional view similar to FIGS. 2 and 3, but showing the conveyor belt entrained about a relatively large (16 tooth, ten inch) sprocket.

The preferred embodiment of the present invention, using a belt 12 assembled of close-ribbed modules 14 and run with a fingered transfer plate assembled of comb modules 132 provides exceptionally good product support, especially when the spaces between ribs is only about one-eighth of an inch wide and the fingers 140 are slim enough to fit freely in those spaces, e.g. each 0.090 inch wide. By having the sprocket teeth drive in pockets located centrally of the undersides of the belt modules, rather than against the connecting rods or hinges, a greater bearing surface is provided, strength is improved and belt tracking stability is increased.

It should now be apparent that the plastic conveyor belt system with improved product support as described hereinabove, possesses each of the attributes set forth in the specification under the heading "Summary of the Invention" hereinbefore. Because it can be modified to some extent without departing from the principles thereof as they have been outlined and explained in this specification, the present invention should be understood as encompassing all such modifications as are within the spirit and scope of the following claims.

What is claimed is:

1. A conveyor system, comprising:
  an endless conveyor belt assembled of a plurality of belt modules integrally molded of synthetic plastic material, each belt module including:
    a plurality of longitudinally extending, transversally closely spaced ribs providing a generally flat upwardly facing support surface;
    transversally extending web means inter-connecting said ribs;
    said ribs being arranged in two intercalated series, of which one has knuckle portions leading the leading ends of said ribs of the other series, and of which said other series has knuckle portions trailing the trailing ends of said ribs of said one series;
    means defining a relatively open hinge slot through each said knuckle portion; and
    means defining at least one downwardly-opening sprocket tooth-reception cavity located midway between the knuckle portions of each of said two series of ribs;
  said belt modules being arranged in a plurality of rows in an interdigitated manner so that trailing hinge slots of respective landing belt modules are aligned transversally of the belt with leading hinge slots of respective longitudinally neighboring trailing belt modules;
  the respective longitudinally neighboring belt module rows being pivotally joined by respective connecting rods received through the respective aligned hinge slots;
  said belt being entrained about a drive roll means and a tracking roll means, and drive roll means including at least one sprocket having a plurality of perimetrically spaced radiating teeth constructed and arranged to drivingly engage said belt in said at least one downwardly opening cavity in respective ones of said belt modules, and central hub means constructed and arranged for mounting said at least one sprocket on a drive shaft for rotation therewith;

on each belt module said web means comprising two generally arcuate webs which are convex towards one another so as to be more nearly vertical and more nearly parallel to one another towards the upper extent thereof, and to flare away from one another near the lower extend thereof, said two webs being spaced from one another longitudinally of the conveyor belt in which the belt module is designed to be incorporated;

on each belt module said at least one downwardly-opening sprocket tooth-reception cavity comprising a plurality of transversally spaced like ones of such cavities, each defined longitudinally between said webs of that belt module and transversally between a respective at least two said ribs of that module;

on each belt module the respective at least two ribs which in part define each said downwardly-opening sprocket tooth-reception cavity being in a first series of said two series of ribs, and each said respective at least two ribs being spaced apart by at least one truncated said rib from a second series of said two series of ribs, each such truncated rib thereby comprising an upper end wall of the respective said downwardly-opening sprocket tooth-reception cavity;

on each said belt module all of said respective at least two ribs and said two webs having means defining a flat lower surface in common, so that each of said cavities is perimetrically bounded by a flat lower surface, which flat lower surface extends longitudinally on said knuckle portions of said ribs to sites underlying said hinge slots.

2. The conveyor system of claim 1, wherein:
each of said relatively open hinge slots is of generally rounded-corner triangular shape as seen in side elevation so as to have a generally horizontal bottom wall portion, a generally vertical sidewall portion nearest said web means and an obliquely oriented downwardly and inwardly facing wall portion.

3. The conveyor system of claim 2, wherein:
each of said connecting rods is of generally cylindrical cross-section and has a diameter which is substantially smaller than the lengths of each of said slot wall portions.

4. The conveyor system of claim 1, wherein:
on each belt module at least one of said knuckle portions in each of said two series of ribs is provided with laterally bulging boss means constructed and arranged to cooperate with surface means of similar belt modules when interdigitated therewith for maintaining the ribs of said belt module laterally spaced from the laterally neighboring ones of the ribs of such similar belt modules.

5. The conveyor system of claim 1, wherein:
on each said belt module there are twenty-four said ribs, spaced approximately one-eighth inch apart.

6. The conveyor system of claim 5, wherein:
on each said belt module there are six said cavities each having but one said truncated rib forming said upper end wall thereof.

7. The conveyor system of claim 1, wherein:
each said sprocket includes a regular polygonal running flange on which said teeth are based, one tooth to a side, midway along such side between opposite terminal apices of such side, each such tooth at its base being narrower than the polygonal running flange side on which it is based, so that the polygonal running flange may run on said flat lower surface perimetrically of the respective said cavity of each said belt module.

8. The conveyor system of claim 7, wherein:
each said sprocket is symmetrical for non-handed installation on a respective shaft.

9. The conveyor system of claim 1, wherein:
on each belt module said ribs have means defining respective flat upper surfaces disposed at a common level, said web means has the upper extent thereof disposed substantially below said level so as to define a respective plurality of upwardly open longitudinally extending grooves among said ribs.

10. The conveyor system of claim 9, wherein:
on each belt module said ribs taper in thickness as they extend downwards from said flat upper surfaces, except that each said knuckle portion is laterally thickened in a respective outer, lower quadrant thereof.

11. The conveyor system of claim 10, wherein:
on each belt module at least one of said knuckle portions in each of said two series of ribs is provided with laterally bulging boss means constructed and arranged to cooperate with surface means of similar belt modules when interdigitated therewith for maintaining the ribs of said belt module laterally spaced from the laterally neighboring ones of the ribs of such similar belt modules.

12. The conveyor system of claim 9, further comprising:
a fingered deadplate including at least one transfer comb module integrally molded of synthetic plastic resin;

said transfer comb module having a base with a plurality of flat-topped, transversally spaced, longitudinally extending fingers projecting therefrom, each finger being laterally flexible and sufficiently thin in a right-to-left sense as to be freely slidably receivable in a respective groove of said belt module;

said base including means constructed and arranged for mounting said transfer comb module to a support.

13. The conveyor system of claim 12, wherein:
said transfer comb module has a cored-out underside having stiffening rib means of uniform thickness for minimizing warpage during manufacture.

14. The conveyor system of claim 13, wherein:
on each said belt module there are twenty-four said ribs, spaced approximately one-eighth inch apart.

15. An endless conveyor belt assembled of a plurality of belt modules integrally molded of synthetic plastic material, each belt module including:
a plurality of longitudinally extending, transversally closely spaced ribs providing a generally flat upwardly facing support surface;

transversally extending web means interconnecting said ribs;

said ribs being arranged in two intercalated series, of which one has knuckle portions leading the leading ends of said ribs of the other series, and of which said other series has knuckle portions trailing the trailing ends of said ribs of said one series;

means defining a relatively open hinge slot through each said knuckle portion; and means defining at least one downwardly-opening sprocket tooth-reception cavity located midway between the knuckle portions of each of said two series of ribs;

said belt modules being arranged in a plurality of rows in an interdigitated manner so that trailing hinge slots of respective leading belt modules are aligned transversally of the belt with leading hinge slots of respective longitudinally neighboring trailing belt modules;

the respective longitudinally neighboring belt module rows being pivotally joined by respective connecting rods received through the respective aligned hinge slots;

on each belt module said web means comprising two generally arcuate webs which are convex towards one another so as to be more nearly vertical and more nearly parallel to one another towards the upper extend thereof, and to flare away from one another near the lower extend thereof, said two webs being spaced from one another longitudinally of the conveyor belt in which the belt module is designed to be incorporated;

on each belt module said at least one downwardly-opening sprocket tooth-reception cavity comprising a plurality of transversally spaced like ones of such cavities, each defined longitudinally between said webs of that belt module and transversally between a respective at least two said ribs of that module;

on each belt module the respective at least two ribs which in part define each said downwardly-opening sprocket tooth-reception cavity being in a first series of said two series of ribs, and each said respective at least two ribs being spaced apart by at least one truncated said rib from a second series of said two series of ribs, each such truncated rib thereby comprising an upper end wall of the respective said downwardly-opening sprocket tooth-reception cavity;

on each said belt module all of said respective at least two ribs and said two webs having means defining a flat lower surface in common, so that each of said cavities is perimetrically bounded by a flat lower surface, which flat lower surface extends longitudinally on said knuckle portions of said ribs to sites underlying said hinge slots.

16. The endless conveyor belt of claim 15, wherein:
each of said relatively open hinge slots is of generally rounded-corner triangular shape as seen in side elevation so as to have a generally horizontal bottom wall portion, a generally vertical sidewall portion nearest said web means and an obliquely oriented downwardly and inwardly facing wall portion.

17. The endless conveyor belt of claim 15, wherein:
on each belt module at least one of said knuckle portions in each of said two series of ribs is provided with laterally bulging boss means constructed and arranged to cooperate with surface means of similar belt modules when interdigitated therewith for maintaining the ribs of said belt module laterally spaced from the laterally neighboring ones of the ribs of such similar belt modules.

18. The endless conveyor belt of claim 15, wherein:
on each said belt module there are twenty-four said ribs, spaced approximately one-eighth inch apart.

19. The endless conveyor belt of claim 18, wherein:
on each said belt module there are six said cavities each having but one said truncated rib forming said upper end wall thereof.

20. The endless conveyor belt of claim 15, wherein:
on each belt module said ribs have means defining respective flat upper surfaces disposed at a common level, said web means has the upper extent thereof disposed substantially below said level so as to define a respective plurality of upwardly open longitudinally extending grooves among said ribs.

21. The endless conveyor belt of claim 20, wherein:
on each belt module said ribs taper in thickness as they extend downwards from said flat upper surfaces, except that each said knuckle portion is laterally thickened in a respective outer, lower quadrant thereof.

22. The endless conveyor belt of claim 21, wherein:
on each belt module at least one of said knuckle portions in each of said two series of ribs is provided with laterally bulging boss means constructed and arranged to cooperate with surface means of similar belt modules when interdigitated therewith for maintaining the ribs of said belt module laterally spaced from the laterally neighboring ones of the ribs of such similar belt modules.

23. A belt module for assembly with like modules to provide an endless conveyor belt, said belt module being integrally molded of synthetic plastic material and comprising:

a plurality of longitudinally extending, transversally closely spaced ribs providing a generally flat upwardly facing support surface;

transversally extending web means interconnecting said ribs;

said ribs being arranged in two intercalated series, of which one has knuckle portions leading the leading ends of said ribs of the other series, and of which said other series has knuckle portions trailing the trailing ends of said ribs of said one series;

means defining a relatively open hinge slot through each said knuckle portion;

means defining at least one downwardly-opening sprocket tooth-reception cavity located midway between the knuckle portions of each of said two series of ribs;

on each belt module said web means comprising two generally arcuate webs which are convex towards one another so as to be more nearly vertical and more nearly parallel to one another towards the upper extent thereof, and to flare away from one another near the lower extent thereof, said two webs being spaced from one another longitudinally of the conveyor belt in which the belt module is designed to be incorporated.

on each belt module said at least one downwardly-opening sprocket tooth-reception cavity comprising a plurality of transversally spaced like ones of such cavities, each defined longitudinally between said webs of that belt module and transversally between a respective at least two said ribs of that module;

on each belt module the respective at least two ribs which in part define each said downwardly-opening sprocket tooth-reception cavity being in a first series of said two series of ribs, and each said respective at least two ribs being spaced apart by at least one truncated said rib from a second series of said two series of ribs, each such truncated rib thereby comprising an upper end wall of the respective said downwardly-opening sprocket tooth-reception cavity;

on each said belt module all of said respective at least two ribs and said two webs having means defining a flat lower surface in common, so that each of said cavities is perimetrically bounded by a flat lower surface, which flat lower surface extends longitudinally on said knuckle portions of said ribs to sites underlying said hinge slots.

24. The belt module of claim 23, wherein:
each of said relatively open hinge slots is of generally rounded-corner triangular shape as seen in side elevation so as to have a generally horizontal bottom wall portion, a generally vertical sidewall portion nearest said web means and an obliquely oriented downwardly and inwardly facing wall portion.

25. The belt module of claim 23, wherein:
at least one of said knuckle portions in each of said two series of ribs is provided with laterally bulging boss means constructed and arranged to cooperate with surface means of similar belt modules when interdigitated therewith for maintaining the ribs of said belt module laterally spaced from the laterally neighboring ones of the ribs of such similar belt modules.

26. The belt module of claim 23, wherein:
there are twenty-four said ribs, spaced approximately one-eighth inch apart.

27. The belt module of claim 26, wherein:
there are six and cavities each having but one said truncated rib forming said upper end wall thereof.

28. The belt module of claim 23, wherein:
said ribs have means defining respective flat upper surfaces disposed at a common level, said web means has the upper extend thereof disposed substantially below said level so as to define a respective plurality of upwardly open longitudinally extending grooves among said ribs.

29. The belt module of claim 28, wherein:
said ribs taper in thickness as they extend downwards from said flat upper surfaces, except that each said knuckle portion is laterally thickened in a respective outer, lower quadrant thereof.

30. The belt module of claim 29, wherein:
at least one of said knuckle portions in each of said two series of ribs is provided with laterally bulging boss means constructed and arranged to cooperate with surface means of similar belt modules when interdigitated therewith for maintaining the ribs of said belt module laterally spaced from the laterally neighboring ones of the ribs of such similar belt modules.

* * * * *